(12) United States Patent
Main et al.

(10) Patent No.: US 6,674,724 B1
(45) Date of Patent: Jan. 6, 2004

(54) INTEGRATED TELECOMMUNICATIONS TEST SYSTEM

(75) Inventors: Brian A. Main, Roseville, CA (US); Michael U. Bencheck, Denison, TX (US); Dale W. Harris, Jr., Richardson, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/251,546

(22) Filed: Feb. 17, 1999

(51) Int. Cl.[7] .............................................. G01R 31/08
(52) U.S. Cl. ....................................... 370/241; 370/247
(58) Field of Search ................................. 370/241, 242, 370/247, 251, 252, 253, 249

(56) References Cited

U.S. PATENT DOCUMENTS 5,826,034 A * 10/1998 Albal .......................... 709/239
6,189,031 B1 * 2/2001 Badger et al. ............... 709/224
6,285,687 B1 * 9/2001 Lovelace et al. ............ 370/509

* cited by examiner

*Primary Examiner*—Wellington Chin
*Assistant Examiner*—Brenda Pham

(57) ABSTRACT

An integrated web-based system for performing telecommunications system testing includes an application server that includes a plurality of test applications. The application server provides a graphical user interface to a plurality of workstation clients. Users can launch tests and monitor test results at the workstation clients. The test are performed by a plurality of telecommunications system test devices. The test devices include such devices as protocol analyzers, bit error rate testers, sniffers, and the like. A test access server provides an interface or bridge between the application server and each of the test devices. The test access server routes and provides appropriate translation of messages and commands between the test devices and the application process server.

22 Claims, 1 Drawing Sheet

INTEGRATED TELECOMMUNICATIONS TEST SYSTEM

FIELD OF THE INVENTION

The present invention relates generally to telecommunication system testing, more particularly to a web-based integrated comprehensive system for testing telecommunications systems that include both local and long distance networks.

DESCRIPTION OF THE PRIOR ART

Telecommunications systems are vast and complex systems that include a variety of subsystems and devices. Telecommunications systems may include both local and long distance networks that include thousands of devices provided by different manufacturers.

In order to ensure system operability and quality of service, it is necessary to test the devices and circuits within a telecommunications system. Currently, there exist many test devices that are used in telecommunication system testing. The test devices are located at the site of the device to be tested. The test devices may be semi-permanently connected to the equipment or they may be portable equipment that may be connected to the device by a tester at the time of the test.

Current telecommunications testing is very expensive in terms of both personnel and equipment costs. Test equipment, and particularly portable test equipment, is expensive. Moreover, on location testing requires that test personnel either be located at or travel to the device under test.

There is a desire to centralize testing in order to reduce the personnel and equipment costs. However, each piece of test equipment typically has unique interfaces, which makes centralized testing virtually impossible. It is an object of the present invention to integrate all remote testing into one common platform that supports all products and devices for both local and long distance services.

SUMMARY OF THE INVENTION

The present invention provides an integrated web-based system for performing telecommunications system testing. The system includes an application server that includes a plurality of test applications. The application server provides a graphical user interface to a plurality of workstation clients. Users can launch tests and monitor test results at the workstation clients. The test are performed by a plurality of telecommunications system test devices. The test devices include such devices as protocol analyzers, bit error rate testers, sniffers, and the like. A test access server provides an interface or bridge between the application server and each of the test devices. The test access server routes and provides appropriate translation of messages and commands between the test devices and the application process server.

DESCRIPTION OF THE PREFERRED EMBODIMENT

Figure 1:
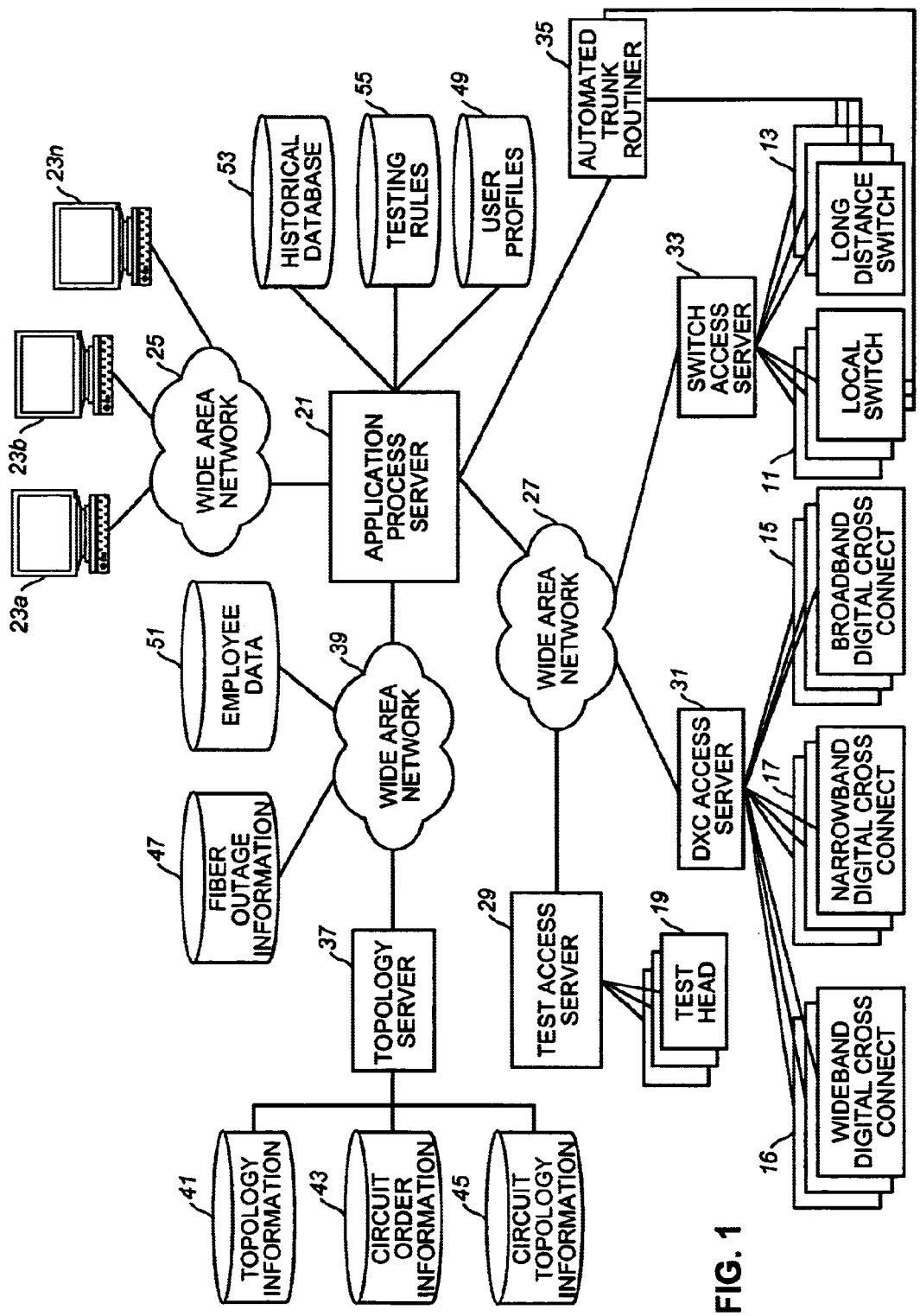
FIG. 1 is a block diagram of a system according to the present invention.

Referring now to the drawing, FIG. 1 illustrates a block diagram of a system according to the present invention. The system of the present invention is adapted to perform tests on a large telecommunications system that includes both local and long distance networks. The networks of the system under test include local switches, indicated generally by the numeral 11 and long distance switches, indicated generally by the numeral 13. Additionally, the system under test includes plurality of broadband digital cross connect devices, indicated generally by the numeral 15, a plurality of wideband digital cross connect devices indicated by numeral 16, and a plurality of narrowband digital cross connect devices, indicated generally by the numeral 17.

The switches 11–13 and the cross connect devices 15–17 each have test interfaces. However, the switches 11–13 and the cross connect devices 15–17 in a typical network are manufactured by different vendors. Accordingly, each vendor's switch and cross connect type typically has a unique, vendor specific test interface.

The system of the present invention includes a plurality of test heads designated generally by the numeral 19. Test heads 19 include such pieces of equipment as protocol analyzers, bit error rate testers, sniffers, and the like, as are well known to those skilled in the art. Test heads 19 are connected to network elements to perform network testing. Test heads 19 are manufactured by different vendors, and each test head 19 typically has a unique, vendor specific test interface.

The system of the present invention includes an application process server (APS) 21 and a plurality of client workstations 23. Application process server 21 provides processing for all testing in the network under test. Users access application process server 21 by means of graphical user interfaces displayed upon workstation clients 23. Client workstations 23 access application process server 21 through a wide area network 25, which in the preferred embodiment is a private intranet system. Users are able to invoke tests and view test results and alarms with the graphical user interfaces provided by application process server 21 and workstation clients 23.

Application process server 21 communicates with the different vendor's switches 11–13, digital cross connects 15–17, and test heads 19 through a wide area network 27. Wide area network 27 is depicted in FIG. 1 as separate from wide are network 25 for purposes of clarity of illustration. However, wide are networks 25 and 27 may be implemented in the same physical network.

The system of the present invention includes access servers that act as interfaces or bridges between the application server and the various test devices. Thus, the system of the present invention includes a test access server 29 that provides an interface to the test heads 19. Test access server 29 routes and provides any necessary translation of messages between each test head 19 and application process server 21. Similarly, the system of the present invention includes a digital cross connect access server 31, which acts as a bridge between application process server 21 and digital cross connects 15 and 17, and a switch access server 33, which serves as a bridge between application process server 21 and switches 11 and 13.

A set of application programming interfaces (APIs) is provided between APS 21 and the various access servers 29–33. APS 21 has all of the rules and intelligence for performing tests. The APS generates generic commands for to each access server. The access servers provide translation to the vendor specific interfaces.

For each test session, the APS will generate a Access server Session Id that will be used for the duration of the test.

The Access server Session Id is used to relate all the commands and responses that are used during a test session. This number will be unique across all the APS processes. Access server Session Id "0" is reserved for Access server internal use so the APS should never use this Access server Session Id. The APS will also generate a correlation tag (CTAG) for each command in the test session. The CTAG is used to relate responses to their command. The CTAG must be unique for a command within a Access server session.

Generally, the flow of a single user test session is as follows:

1. Create Access server Session—This establishes the Access server Session;
2. Connect Test Access—This connects to the Test Head;
3. Miscellaneous Test Commands;
4. Cleanup Commands to restore circuit;
5. Disconnect Test Access—Disconnect from the Test Head;
6. Cancel Access server Session—Disconnect from the Access server.

Steps 2 through 5 can be repeated until all testing is complete.

The flow of a multiple APS test session is generally as follows:

1. Create Access server Session—This establishes the Access server Session;
2. Connect Test Access—This connects to the Test Head;
3. Miscellaneous Test Commands;
4. Connect Access server Session—Subsequent APS added to Access server Session—All responses will be sent to each IP socket attached to the Access server Session. There will be only one connection from an APS for a Access server Session. If multiple users request connection to the same Access server Session through the same APS, the APS will handle routing the responses back to each user.
5. Miscellaneous Test Commands;
6. Disconnect Access server Session—Disconnects an APS from test Session;
7. Cleanup Commands to restore circuit
8. Disconnect Test Access—Disconnect form the Test Head;
9. Cancel Access server Session—Disconnect from the Access server.

Steps 2 through 8 and 4 through 6 can be repeated until all testing is complete.

Occasionally, a connection to the Access server will be broken. In those cases, a test session is re-established as follows:

1. A Connect Access server Session command will reconnect to the Access server Session. When the connection to the Access server is broken, the Access server will maintain the session for a period of time to wait for a reconnect. When Access server receives a connection request for a broken session, it will be assigned immediately without any attempt to identify if the new connection actually corresponds to same client as the broken connection.
2. If the Access server Session is still active, normal testing resumes.
3. If the Access server Session is not active, an invalid session status will be returned to the APS. The APS will create a new Access server Session with same Session Id, perform any required cleanup, then restart the test.

The Access server will close the TCP connection by executing the TCP "close" API immediately after sending a cancel or disconnect session response. The APS will get the response and then EOF, and then execute the TCP "close" API.

Any time an APS client thread or process is attempting to communicate with Access server, it is in one of the following three states:

1. APS client is connected and sending or receiving to/from Access server;
2. The client is disconnected from Access server and attempting to connect;
3. The client is finished with Access server and disconnecting.

Under each of these states, several unique failures may occur. Note that the terms connect or disconnect in this context apply to a communications socket as opposed to Access server-APS transactions with similar names. Below is a list of the states, the possible detected failures and the appropriate actions by the APS client. Notice that at no time does APS try to use the same connection to resend a command which failed to receive a response.

1. APS is in a state of socket connecting to Access server;
    FAILURE: TCP "Host unreachable"
    APS ACTION: Report entire Access server server is down or inaccessible, retry later;
    FAILURE: TCP "Connection refused";
    APS ACTION: Report Access server server up, but Access server process is down, retry soon;
    FAILURE: TCP "Network Unreachable";
    APS ACTION: Report intranet is down, retry soon;
    FAILURE: TCP "Timed out";
    APS ACTION: Report Access server server process is inundated, retry soon;
    FAILURE: TCP "Connection reset"
    APS ACTION: Report Access server server process is inundated, retry soon.
2. APS socket connected and sending/receiving to/from Access server;
    FAILURE: Select "Timed out" sending or receiving
    APS ACTION: Report Access server server process has hung, retry now after reconnecting.
    FAILURE: TCP "Connection reset by peer"
    APS ACTION: Report Access server process has crashed or bounced, retry now after reconnecting.
    FAILURE: TCP "Broken Pipe"
    APS ACTION: Report Access server server is shutting down, retry later.
    FAILURE: TCP "Network unreachable"
    APS ACTION: The MCI intranet has gone down, retry later.
    FAILURE: TCP "I/O"
    APS ACTION: Report that the Access server server connection has failed, retry now after reconnecting.
3. APS is in a state of disconnecting the socket from Access server
    FAILURE: Any
    APS ACTION: Report a warning and take no further action, since disconnecting only occurs after all transactions have completed.

There are several Access server specific commands required to setup, connect, disconnect, and shutdown. The Access server Session Commands have a separate enum field in the Access server Header to allow more efficient parsing code generation.

1. The Create Access server Session establishes the Access server Session.

2. The Connect Access server Session command connects a second or subsequent APS to an established Access server Session. This command is also used by the APS to reconnect to the Access server when the link goes down. If multiple APS's are connected to a Access server Session, Access server will accept commands from any of the users connected to the session and send responses to each IP socket connected to the Access server Session.

3. The Disconnect Access server Session command disconnects an APS from a Access server Session. If the last APS on a Access server Session issues the Disconnect Access server Session command, Access server will respond with the tsDiscInv warning in the Access server Status. The Access server Session will remain active for a configurable amount of time so that an APS can reconnect to the session. If no APSs are connected in this amount of time, the Access server will close the Access server Session. The Access server will execute the TCP "close" API immediately after terminating the Access server Session. The APS will get an EOF and then execute the TCP "close" API.

4. The Cancel Access server Session command is used by the APS to close a Access server Session and disconnect from the Access server. It tells the Access server to disconnect from the APS and flush all buffers. If there are multiple APSs connected to a Access server Session, the Cancel Access server Session will close all of the connections to the Access server Session. The Access server will execute the TCP "close" API immediately after sending the Cancel Access server Session response. The APS will get the response and then EOF, and then execute the TCP "close" API.

5. The Keep Alive command is used by APS to determine if the Access server is active. The Access server will also use the response message to: 1) request the APS to stop sending new Create Access server Session commands, which allows the system to bleed and 2) to announce it will shutdown in 300 seconds.

When a test session is complete, the APS will send the Disconnect Access server Session command to the Access server if it wants to keep the Access server Session active so another APS can reconnect. The Access server Session will remain active for a configurable time period. When the Access server receives the Disconnect Access server Session, it will clean up any buffered data and disconnect from the APS. The Access server will execute the TCP "close" API immediately after disconnecting the Access server Session. The APS will get an EOF and then execute the TCP "close" API. To end a Access server Session, the APS should restore circuits under test to their normal state and send a Cancel Test Access command. The Access server does not track which tests have been performed so it can not restore circuits to their normal state.

If the connection from the APS to the Access server is lost, both the APS and Access server will perform recovery functions. The Access server will:

1. Buffer responses up to 5 minutes or 200 messages; and,
2. After above threshold exceeded, disconnect from test head, cancel the Access server session, and flush its buffers.

The APS will:

1. Attempt to re-establish connection to the Access server with Test Session Id; and,
2. If the link is still unavailable after two failed attempts, the APS will fail the test and page support to notify them of the problem.

To re-establish a Access server connect, the APS will send the Connect Access server Session command with the Access server Session Id. If the session is still active, the Access server will send any buffered messages, and the APS can continue the test. If the Access server Session is not active, the APS will restart the test using normal test procedures.

If the results of the request are not received within defined time period, the command will be resent. The APS will make this a parameter of the command and therefore will be easy to change for tuning. After a failed attempt, the APS will assume the connection and test were lost, recover and restart the test in the appropriate step, and write a log entry.

The normal test commands are sent by the APS to the Access server and the Access server will send back either a success or error message. Some special commands require optional fields or receive additional responses. The following show some examples of these special commands.

1. The Connect Test Access command connects the Test Session to a Test Head. This command requires a DXC Name, AID, Access server Session and CTAG.
2. The Loopback T1 command can perform loops in several locations in a circuit, which is determined by the Loop Type field. The response to this command includes a Fail Code boolean field that is set on if a loop up is not detected.
3. The Measure Signal T1 command is used to measure the incoming line signal based on an expected bit pattern. The measurement time, reporting interval, and expected bit pattern are required inputs. This command sends multiple responses based on the reporting interval. The first response will be a success or error message.

According to the present inventio, there will be a different IP connection per test. The Access server will not receive an acknowledgment message from APS. The Access server will always send a reply back. For any commands that receive multiple responses, the Access server will first send a success or error response, then the message response(s). See section. The Access server will have test head/command specific timeout configurable values and will keep timeout histories. When the device/command timeout is exceeded the Access server will return a tsTimeout (new) status to the APS. The APS will also keep command specific, configurable timeouts that will be used by the APS to determine how long to wait for the Access server to respond to a command. If the timeout duration is exceeded, the APS will assume that the Access server is down.

The system of the present invention includes an automated trunk routiner 35. Automated trunk routiner 35 performs automated DS1 circuit testing on switches 11 and 13.

Application process server 21 accesses various databases in connection with its operation. The system of the present invention includes a topology server 37, which communicates with application process server 21 through a wide area network 39. Again, wide area network 39 is shown as a separate network from wide area networks 25 and 27 for purposes of clarity of illustration. However, wide area network 39 is preferably a private intranet and it may be the same physical network as networks 27 and 29.

Topology server 37 accesses a topology information database 41, a circuit order information database 43, and a circuit topology information database 45. Application process server 21 uses information in databases 41–45 to display topology information to users on client workstations 23 and for performing testing. Application process server 21 also accesses a fiber outage information database 47 through wide area network 39 in order to provide fiber outage information to client workstations 23.

Application process server 21 provides security to the system of the preferred embodiment. Users are identified by a user ID and, preferably, by various levels of passwords. Application process server maintains security information in a user profiles database 49. Application process server 21 accesses an employee database 51 through wide area network 39.

Application process server 21 maintains an historical database 53. Historical database 53 contains records of tests for bench marking purposes. Users can access historical information through client workstations 23.

The system of the present invention maintains testing rules in a testing rules database 55. Application process server 21 accesses testing rules database 55 for the purpose of performing tests.

From the foregoing, it may be seen that the present invention provides a web-base integrated test system that enables all network circuits and elements to be tested with a common user interface. The present invention has ilustrated and described with reference to a presently preferred embodiment. Those skilled in the art will recognize alternative embodiment and that certain features of invention may be used independent of, or together with, other features, given the benefit of the foregoing description.

What is claimed is:

1. A system for performing telecommunications system testing, which comprises:
    an application server, said application server including a plurality of test applications;
    a plurality of telecommunications system test heads, the test heads at least capable of testing one or more portions of a physical layer; and,
    a test access server, said test access server providing an interface between said application server and each of said test heads.

2. The system as claimed in claim 1, including:
    a topology server in communication with said application server, said topology server providing network topology information to said application server.

3. The system as claimed in claim 2, wherein said topology server provides circuit order information to said application server.

4. The system as claimed in claim 2, wherein said topology server provides circuit topology information to said application server.

5. The system as claimed in claim 2, wherein said application server communicates with said topology server over a wide area network.

6. The system as claimed in claim 1, wherein said telecommunication system includes a plurality of switches and said system includes:
    a switch access server, said switch access server providing an interface between said application server and said switches.

7. The system as claimed in claim 6, including a automated trunk routiner in communication with said switches and said application server.

8. The system as claimed in claim 1, including a testing rules database accessible by said application server.

9. The system as claimed in claim 1, including a user profile database accessible by said application server.

10. The system as claimed in claim 1, including an historical information database accessible by said application server.

11. The system as claimed in claim 1, including a fiber outage database accessible by said application server.

12. The system as claimed in claim 11, wherein said fiber outage database is accessible by said application server over a wide area network.

13. The system as claimed in claim 1, including an employee information database accessible by said application server.

14. The system as claimed in claim 13, wherein said employee information database is accessible by said application server over a wide area network.

15. A system for performing telecommunications system testing comprising:
    an application server, said application server including a plurality of test applications;
    a plurality of telecommunications system test heads;
    a test access server, said test access server providing an inter between said application server and each of said test heads; and
    a digital cross connect access server, said digital cross connect access server providing an interface between said application server and a plurality of digital cross connect devices.

16. The system as claimed in claim 15, wherein said digital cross connect devices wideband digital cross connect devices include narrowband digital cross connect devices and broadband digital cross connect devices.

17. The system as claimed in claim 15, wherein said application server communicates with said digital cross connect access server over a wide area network.

18. A system for performing telecommunications system testing comprising:
    an application server, said application server including a plurality of test applications;
    a plurality of telecommunications system test heads;
    a test access server, said test access server providing an interface between said application server and each of said test heads; and
    a switch access server, said witch U s server providing an interface between said application server and a plurality of switches, wherein said switches include local switches and long distance switches.

19. The system as claimed in claim 18, wherein said switch access server communicates with said application server over a wide area network.

20. A system for performing testing of a physical layer of a telecommunications system, which comprises:
    an application server, said application server including a plurality of test applications;
    a plurality of telecommunications system test heads for testing the physical layer of the telecommunications system; and,
    a test access server, said test access server providing an interface between said application server and each of said test heads.

21. The system of claim 20, wherein the test access server routes and provides any necessary translation of messages between each test head and the application server.

22. A system for performing telecommunications system testing, which comprises:
    an application server, said application server including a plurality of test applications;
    a plurality of telecommunications system test heads that test one or more physical layers of the telecommunications system; and,
    a test access server, said test access server providing an interface between said application server and each of said test heads.

* * * * *